Nov. 29, 1955                  R. BRANDT                    2,725,026
              MACHINE FOR SOLDERING LEAD-WIRES OF LAMPS
Filed Dec. 12, 1951                                    2 Sheets-Sheet 1

INVENTOR
ROGER BRANDT.
BY
ATTORNEY

Nov. 29, 1955 R. BRANDT 2,725,026
MACHINE FOR SOLDERING LEAD-WIRES OF LAMPS
Filed Dec. 12, 1951 2 Sheets-Sheet 2
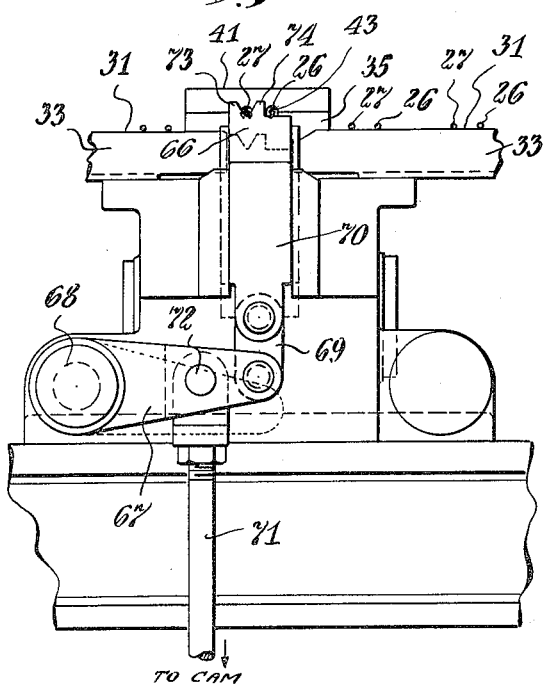
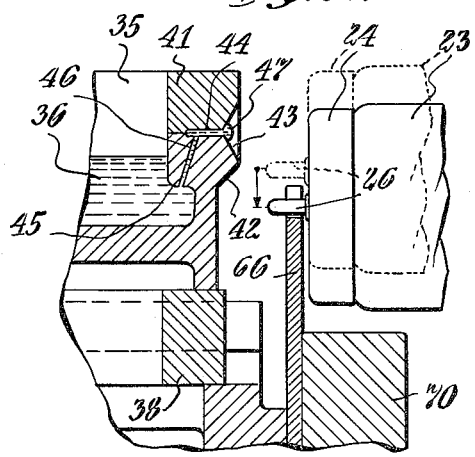
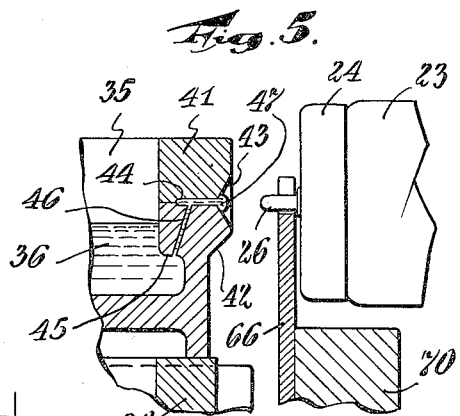
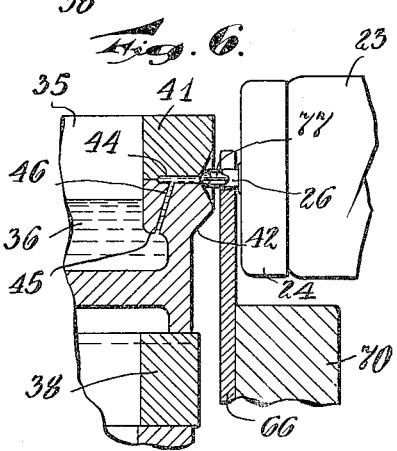
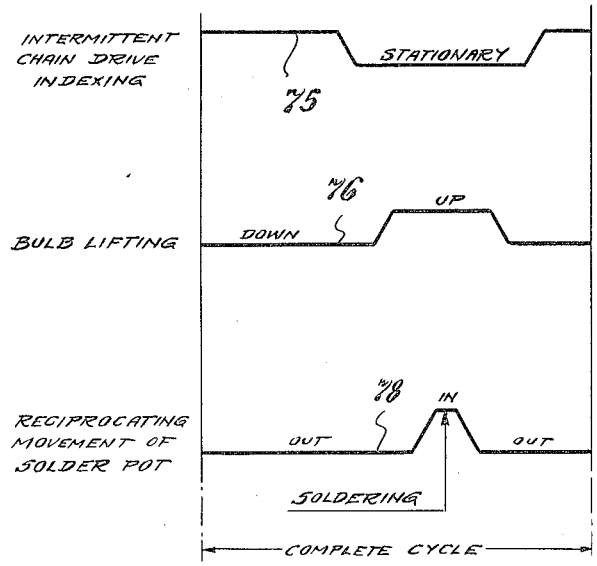
INVENTOR
ROGER BRANDT
BY
ATTORNEY United States Patent Office 2,725,026
Patented Nov. 29, 1955

2,725,026

MACHINE FOR SOLDERING LEAD-WIRES OF LAMPS

Roger Brandt, Hartford, Conn., assignor to Westinghouse Electric Corporation, East Pittsburgh, Pa., a corporation of Pennsylvania Application December 12, 1951, Serial No. 261,350

12 Claims. (Cl. 113—59)

This invention relates to soldering and, more particularly, to a soldering device for supplying clean molten solder horizontally to lamp contact pins and contained lead wires.

The principal object of my invention, generally considered, is to provide a pot for holding molten solder and feeding it by capillary action to form beads in countersunk pockets in the outer surface of a side wall of said pot, whereby it may be employed to solder the leads to lamp contact pins in which the leads have been previously trimmed and fluxed.

Another object of my invention is to provide a soldering device presenting a clean surface of solder to contact pins of fluorescent lamps and, at the same time, avoiding overflow of said solder from the pins as well as from the soldering device.

A further object of my invention is to provide a soldering device in which clean molten solder is drawn from below the surface of solder in a pot thereof and fed horizontally to be engaged by the contact pins of fluorescent lamps from which the extending leads have been trimmed, and to which flux has been applied.

A still further object of my invention is to provide a soldering machine for lamps comprising a reciprocable solder pot, means for feeding solder horizontally from a side of said pot, a conveyor for moving such lamps horizontally in a direction perpendicular to the line of reciprocation of said pot to indexing position with respect to and then beyond said pot, power means for driving said conveyor, and means driven by said power means for reciprocating said pot toward a lamp as it is indexed to effect soldering of its leads to pins thereof.

An additional object of my invention is to provide a soldering machine for lamps comprising a reciprocable solder pot, means for feeding solder from a side of said pot, a conveyor for moving such lamps horizontally while contact pins thereof are at a level lower than that of the solder feed from said pot, in order to allow for variations in the diameter of the envelopes or bulbs of said lamps, and in a direction perpendicular to the line of reciprocation of said pot, to indexing position with respect to and then beyond said pot, power means driving said conveyor, and means driven by said power means for raising the adjacent pins of a lamp as it is indexed at the solder pot to an elevation in registry with the solder feed portion of said pot.

Other objects and advantages will become apparent as the description proceeds.

Referring to the drawing:

Figure 3 is a sectional view on the line III—III of Figure 1, in the direction of the arrows.

Figure 4 is a fragmentary vertical sectional view, corresponding to Figure 1 but on a larger scale, and showing the position of the parts when a lamp has been indexed at a soldering station, but prior to being raised to soldering position.

Figure 5 is a view corresponding with Figure 4, but showing the next position in which the lamp has been raised to soldering elevation.

Figure 6 is a view corresponding to Figure 5, but showing the next position in which the solder pot has been reciprocated to bring molten solder into engagement with the outer ends of the contact pins and their contained leads, to thereby effect soldering therebetween.

Figure 7 is a graph illustrating the movements of the various parts of the machine.

After fluorescent lamps have had their bases applied, but before said bases are cemented in place, the lead wire portions projecting through and beyond the hollow contact pins thereof may be bent over the ends of the pins to prevent the bases from slipping off the respective ends of the lamps. These lamps are then processed to cement the bases in place thereon. After this has been done, the lead wires projecting beyond the ends of the pins are trimmed off and flux applied to said ends and the contained lead wires. After this has been done, they are transferred, one by one, to a machine embodying my present invention where they have their leads permanently soldered in place in the ends of the contact pins, the lamps being indexed by horizontal movement from one place to another, until they are aligned or register with the soldering device or pot, whereupon one or both ends is or are first raised to soldering elevation and then a solder pot, or solder pots, moved to the contact pins at one end, or to the contact pins at both ends, to apply molten solder to the ends thereof to permanently fix the enclosed leads thereto.

Figure 2:
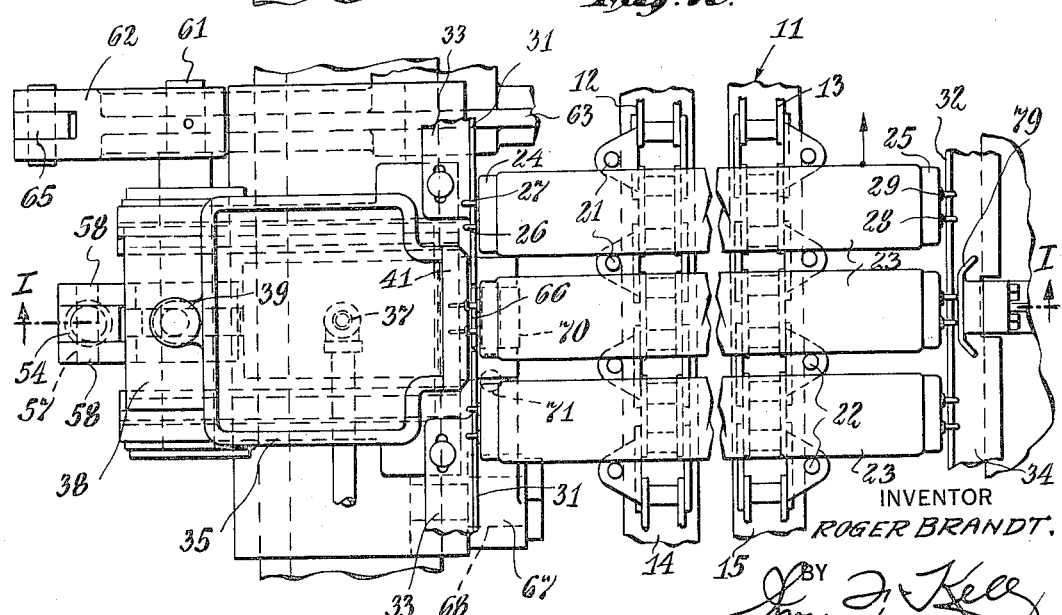
Figure 2 is a fragmentary plan of the machine shown in Figure 1.

Referring to the drawings in detail, like parts being designated by like reference characters, the apparatus of my invention, one embodiment only of which is illustrated, comprises a conveyor 11 comprising a pair of chains, 12 and 13, which are drawn over and supported on angle irons 14 and 15, said irons being in turn supported by vertical structural members 16 and 17, the lower ends of which are connected to horizontal connecting members 18 of the frame 19 of the machine. The upper portions of the chains illustrated, travel in one direction, indicated by the arrow in Figure 2, and their ends pass over supporting pulleys, not shown, the lower portions (not shown) of said chains returning in the opposite direction.

Upstanding from alternate links of the chains 12 and 13, respectively, are pins 21 and 22, the spacing between said pins corresponding substantially with the diameter of the fluorescent lamps 23 carried by the conveyor. The pins 21 and 22 serve only for moving the lamps, the lamps themselves being provided with bases 24 and 25 from the ends of which extend contact pins 26, 27, 28 and 29, said pins being supported on the upstanding flanges 31 and 32 of angle irons 33 and 34.

In the present embodiment, the solder device comprises a vessel or pot 35, desirably formed of metal such as iron or steel which does not alloy with molten solder, and which is not readily melted. The molten solder, indicated at 36, is kept molten by a burner or other heating device 37. The soldering pot shown is conveniently removable from its driving base 38, being held thereon by means of a retractable pin 39, so that it may be taken off the machine and cleaned or otherwise serviced.

The wall thereof, designated 41, through which molten solder is fed to the adjacent pins of the fluorescent lamps being processed, has its upper portion thickened so as to not only extend outwardly, as indicated at 42, to provide conical pockets 43 formed by beveling around the outer ends of horizontal ports 44, but also extending inwardly to provide a ledge 45 overlying a portion of the solder 36 therein.

From the lower surface of said ledge extend capillary apertures 46 which join the capillary ports 44 intermediate their ends, for this purpose desirably extending upwardly and diagonally outward. However, they may extend vertically and the ports 44 may, instead of being exactly horizontal, extend outward and slightly diagonally upward. The size or cross-section of the capillary apertures 46 is such that solder, when molten, will flow thereup to a desired distance above its normal level, to keep the ports 44, also of the proper size or cross-section, filled with solder and supply soldering beads 47 at the outer ends in the conical pockets 43. The shape of the beads 47 is determined by the capillary action of the ports 44. Except for the mechanical problem of construction it would be desirable for the apertures and ports to each be one hole, horizontal at the outlet and curving down into the solder pot.

Figure 1:
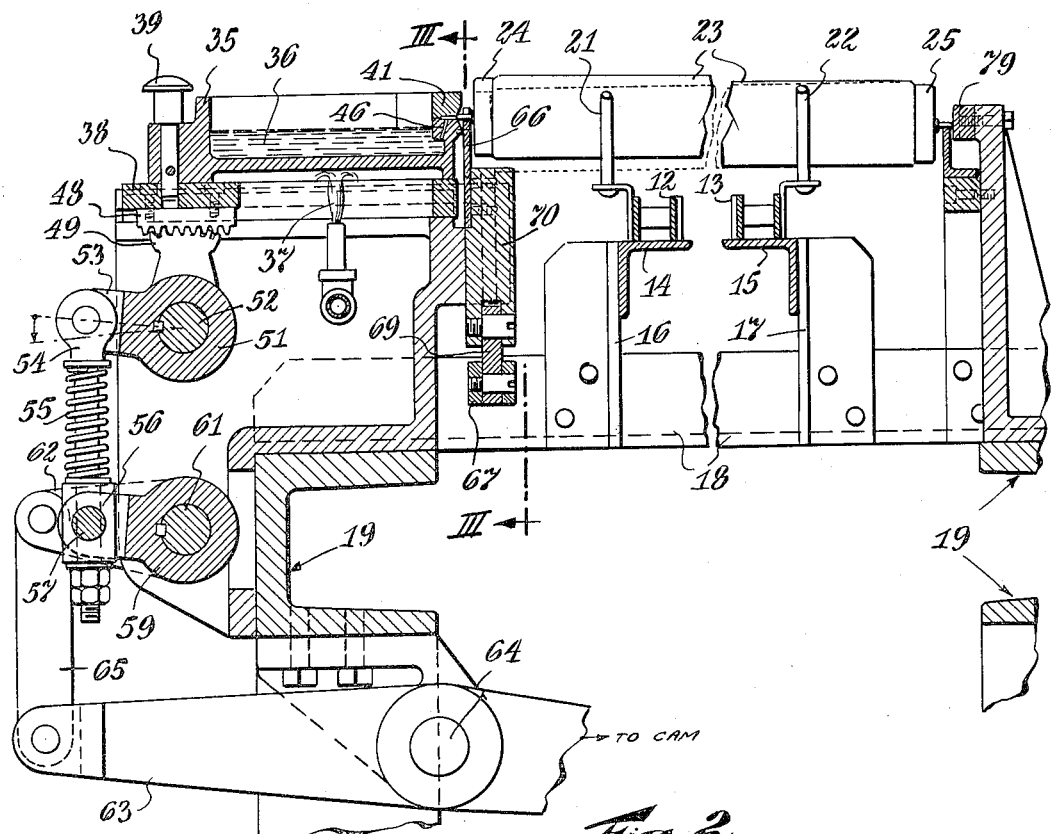
Figure 1 is a vertical sectional view of the line I—I of Figure 2, in the direction of the arrows.

The solder pot 35 is reciprocated toward and away from a lamp indexed thereat, in synchronism with the movement of the chain conveyor 11, by a rack 48 on the bottom of the solder device base 38, engaged by a gear segment 49 extending upwardly from a hub 51 mounted on a shaft 52. The hub 51 also carries a crank 53, to which is pivoted a connecting rod 54 carrying a coil spring 55, the lower end of which engages a collar 56 held on said rod by means of nuts and a washer, as illustrated in Figure 1. The collar 56 desirably has studs 57 outstanding therefrom and pivotally received in arms 58 of a crank 59 keyed to shaft 61. Shaft 61 also carries a crank 62 keyed or otherwise connected thereto, and connected to a lever 63 pivoted to the frame of the machine, as indicated at 64, by means of a link 65. The other end of the lever engages a cam or other drive device moved by the same power means as the conveyor 11, so that its movement is synchronized with the movement of the conveyor.

The ends of the lamps 23 adjacent the soldering device 35 are moved, one by one, as they index in position for soldering, from the elevation indicated in Figure 4 to that of Figure 5, where they are horizontally aligned with the soldering pockets 43, by a slidable plate 66 secured to a lamp lifter member 70. In lowermost position the plate 66 forms a continuation of the supporting flange 31, but it is raised from and back to that position by oscillation of a lever 67, pivoted on a shaft 68, through a link 69 pivoted to the member 70. The lever 67 is oscillated by a connecting rod 71, the upper end of which is pivoted thereinto as indicated at 72, and the lower end of which is actuated by a cam or other device driven by the same power means as that which drives the chain conveyor.

The lever 67 thus operates in synchronism with the conveyor to periodically raise the solder-pot-adjacent-end of a lamp, from normally lower position shown in Figure 4, to elevated or soldering position illustrated in Figure 5, thereby allowing for variations in the diameter of the envelopes or bulbs of the lamps being processed, by corresponding reciprocation of the member 70 and its plate 66, said plate dropping sufficiently below the normal level to receive the pins 26 and 27, one between the upstanding fingers 73 and 74, and the other to the right of the finger 74 as viewed in Figure 3, when in raised position. The plate drops sufficiently below said raised position to allow the pins 26 and 27 to clear the finger 74, for movement with the conveyor, after indexing, soldering, and continued movement of the conveyor.

Operation

From the foregoing disclosure, it will be seen that the operation of soldering lamps, in accordance with the present embodiment of my invention is as follows:

Lamps, after having the projecting lead portions cut off beyond the contact pins and suitable flux applied to said pins, are loaded at the near end of the conveyor, as viewed in Figure 1, and travel from left to right as viewed in Figure 3. The movement is intermittent, that is, travel being interspaced by stops at the position where the pins are in vertical alignment with, but slightly below, the solder-feeding ports 44 and the beveled solder supply pockets 43, all as represented by the graph 75 in Figure 7. The manner of effecting such intermittent drive, that is, the interspacing of movement with indexing stops is well known and need not be explained in detail. Reference is made to the Mullan application Serial No. 215,602, filed March 14, 1951, which discloses such a drive.

Upon reaching this position, the connecting rod 71 rises because of movement of its cam (not shown) to raise the indexed lamp by its pins from the lower position, represented in Figure 4, to the relatively high position, represented in Figure 5, where the pins 26 and 27 are aligned with the horizontal ports 44, all as represented by the graph 76 in Figure 7.

When this occurs, the lever 63 is correspondingly acted on by its cam (not shown) to raise the link 65 and through it the crank 62, oscillating the shaft 61 and through it the crank 59 and its collar 56, thereby resiliently pushing up on the rod 54 through the spring 55. This action resiliently urges the solder pot 35 into engagement with the pins 26 and 27, thereby bringing the beads 47 of molten solder into direct contact with the ends of the pins 26 and 27, said beads being pulled in through the lead-containing holes in said pins over the enclosed leads, by capillary action as shown in Figure 6. This causes the enclosed leads 71 to be firmly soldered thereto. This solder pot movement is represented by the graph 78 in Figure 7. Movement of the lamp being soldered away from the pot 35 is prevented by the abutment or stop device 79 engaged by the pins 28 and 29 at the other end of the lamp. The solder pot is withdrawn from the pins after soldering has been effected. The construction of the soldering device is such that there is no excess solder on or hanging down from a pin when the device moves back to break soldering contact. The beveling of the outlets from the ports 44 cooperates with the capillary action of the hollow pins 26 to 29, incl., to provide sufficient solder for good connections without surplus which might appear as drops on the pin ends.

Although mechanism is illustrated for effecting soldering at only the left hand ends of lamps, as viewed in Figure 1, yet the abutment 79 may be replaced by solder mechanism, such as shown at the left hand ends of said lamps, so that soldering at both ends of each lamp is simultaneously effected. As an alternative, the lamps may move on and have their right hand ends, as viewed in Figure 1, soldered by similar mechanism beyond the position shown in Figure 2. As a further alternative, the ends of the contact pins of the lamp at the right may be soldered at a position on the conveyor prior to reaching the position illustrated in Figure 2. Thus I contemplate soldering both ends of the lamps, either sequentially or simultaneously, said lamps previously having the lead wire portions which project beyond the ends of the contact pins trimmed off and a suitable amount of flux supplied to said pin ends.

Although specifically disclosed for fluorescent lamps, the same principle, and similar equipment, may be employed for soldering the leads of incandescent lamps, and particularly such with contact pins like those here disclosed. However, conventional incandescent lamps may be processed in a similar way. See the McGowan et al. Patent No. 2,429,287, dated October 21, 1947, as disclosing similar apparatus for uniting leads to contacts of both kinds of lamps.

Although preferred embodiments of my invention have been disclosed, it will be understood that modifications may be made within the spirit and scope of the appended claims.

I claim:

1. A soldering device comprising a metal pot having the upper portion of a wall thereof thickened, formed with a pair of capillary apertures extending diagonally upward and outward in said wall and emerging as generally horizontal apertures slightly above the normal level of solder in said pot, and spaced a distance corresponding with the distance between the contact pins of lamps to be soldered, the elevation of said horizontal apertures being such that when molten solder is at a normal level in the pot, it will be drawn up by capillary action to said horizontal apertures and feed to the outer ends thereof, but not overflow therefrom, whereby the device is suitable for applying clean molten solder to the contacts of a lamp.

2. A soldering device comprising a metal pot having the upper portion of a wall thereof thickened, so that an inwardly-projecting downwardly-facing ledge is provided, formed with a pair of capillary apertures extending diagonally upward and outward from said ledge and emerging as generally horizontal apertures slightly above the normal level of solder in said pot, and spaced a distance corresponding with the distance between the contact pins of fluorescent lamps to be soldered, the elevation of said horizontal apertures being such that when molten solder is at a normal level in the pot, it will be drawn up by capillary action to said horizontal apertures and feed to the outer ends thereof, but not overflow therefrom, whereby the device is suitable for applying clean molten solder to the contacts of a fluorescent lamp.

3. A soldering device comprising a metal pot having the upper portion of a wall thereof thickened so that an inwardly-projecting downwardly-facing ledge is provided, formed with a pair of capillary apertures extending from said ledge and emerging above said ledge at the outer surface of said wall as generally horizontal apertures slightly above the normal level of solder in said pot, and spaced a distance corresponding with the distance between the contact pins of lamps to be soldered, the elevation of said apertures being such that when molten solder is in a normal level in said pot it will be drawn up by capillary action and fed to the outer ends of said apertures but not overflow therefrom.

4. A soldering device comprising a metal pot having the upper portion of a wall thereof thickened so that an inwardly-projecting downwardly-facing ledge is provided, formed with a pair of capillary apertures extending from said ledge and emerging above said ledge at the outer surface of said wall as generally horizontal apertures slightly above the normal level of solder in said pot, and spaced a distance corresponding with the distance between the contact pins of lamps to be soldered, the outer end of each aperture terminating in an outwardly flared pocket to house a bead of molten solder ready for use, the elevation of said apertures being such that when molten solder is in a normal level in said pot it will be drawn up by capillary action and fed to the outer ends of said apertures but not overflow therefrom.

5. A soldering machine for the contact pins of fluorescent lamps comprising a reciprocable solder pot having the upper portion of a wall thereof thickened, formed with a pair of capillary apertures extending diagonally upward and outward in said wall and emerging as generally horizontal apertures slightly above the normal level of solder in said pot, and spaced a distance corresponding with that between the contact pins of such lamps to be soldered, the elevation of said horizontal apertures being such that when molten solder is at a normal level in the pot, it will be drawn up by capillary action to said horizontal apertures and feed to the outer ends thereof, but not overflow therefrom, the outer end of each aperture terminating in an outwardly flared pocket to house a bead of molten solder ready for use, means for heating said reciprocating solder pot to maintain the solder therein molten and to produce capillary flow thereof, means operable to periodically cause reciprocation of said solder pot, a conveyor for supporting said lamps and for intermittently moving such lamps horizontally in timed relation with said reciprocating solder pot, while contact pins of said lamps are at a level lower than that of said horizontal apertures, in a direction perpendicular to the line of reciprocation of said pot, power means for driving said conveyor and said solder pot reciprocating means, and means driven by said power means for raising the adjacent pins of a lamp, as it is indexed, to an elevation in registry with said beads.

6. A soldering machine for the lead-containing hollow contact pins of fluorescent lamps comprising a conveyor with a plurality of lamp holders for moving lamps horizontally, a solder pot on each side of said conveyor, each pot having an upper portion of the conveyor-adjacent wall thereof thickened, formed with a pair of capillary apertures extending diagonally upward and outward in said wall and emerging as generally horizontal apertures slightly above the normal level of solder in said pots, each pair of apertures being spaced a distance corresponding with the distance between the contact pins to be soldered, the elevation of said horizontal apertures being such that molten solder at normal level is drawn up thereto by capillary action and fed to the outer ends thereof but does not overflow therefrom, the lamp holders being such that the hollow contact pins are normally at a level lower than that of the solder feed from said pots, said conveyor being adapted to move such lamps in a direction perpendicular to the line between said pots to indexing position with respect thereto, power means for driving said conveyor, elevating means driven by said power means for raising each lamp as it is indexed at the solder pots to an elevation to register the pins of said lamp with the solder feed portions of said pots, said pots being supported for reciprocating movement in a horizontal plane toward and away from said conveyor, means to heat said solder pots to maintain the solder therein in a molten state and to produce capillary flow thereof, means to reciprocate said pots, means also driven by said power means to actuate the reciprocating means when a lamp is raised above the conveyor level, means to intermittently drive the conveyor in timed relationship with the reciprocation of said solder pots, and means to actuate the reciprocating means and the elevating means between movements of the conveyor, in order to effect soldering of said pins and leads at both ends thereof.

7. A soldering machine for the lead-containing hollow contact pins of lamps comprising a conveyor with a plurality of lamp holders for moving lamp horizontally, a solder pot on one side of said conveyor, said pot having an upper portion of the conveyor-adjacent wall thereof thickened, formed with a capillary aperture extending diagonally upward and outward in said wall and emerging as a generally horizontal aperture slightly above the normal level of solder in said pot, the elevation of said horizontal aperture being such that molten solder at normal level is drawn up thereto by capillary action and fed to the outer end thereof but does not overflow therefrom, the lamp holders being such that the hollow contact pins are normally at a level lower than that of the solder feed from said pot, said conveyor being adapted to move such lamps in a direction perpendicular to the line of solder feed from said pot to indexing position with respect thereto, power means for driving said conveyor, elevating means driven by said power means for raising each lamp as it is indexed at the solder pot to an elevation to register the pins of said lamp with the solder feed portion of said pot, said pot being supported for reciprocating movement in a horizontal plane toward and away from said conveyor, means for heating said solder pots to maintain the solder therein molten and to produce capillary flow thereof, means to reciprocate said pot, means also driven by said power means to actuate the reciprocating means when a lamp is raised above the conveyor level, means to intermittently drive the conveyor in timed relationship with the reciprocation of said solder pots, and means to actuate the reciprocating means and the elevating means between movements of the conveyor, in order to effect soldering of said pins and leads.

8. A soldering machine for lamps comprising a reciprocable solder pot, means for heating said solder pot to maintain the solder therein molten and to produce capillary flow thereof, means for feeding solder horizontally from a side of said pot comprising a pair of capillary apertures extending diagonally upward and outward in the wall of said solder pot and emerging as generally horizontal apertures slightly above the normal level of the molten solder in said pot, a conveyor for intermittently moving such lamps horizontally in a direction perpendicular to the line of reciprocation of said pot to an indexing position adjacent the latter, power means for driving said conveyor, and means driven by said power means for reciprocating said pot toward and away from a lamp as it is indexed, to effect soldering of its leads to pins thereof.

9. A soldering machine for lamps comprising a reciprocable solder pot, means for heating said solder pot to maintain the solder therein molten and to produce capillary flow thereof, means for feeding solder horizontally from a site of said pot comprising a pair of capillary apertures extending diagonally upward and outward in the wall of said solder pot and emerging as generally horizontal apertures slightly above the normal level of the molten solder in said pot, a conveyor for intermittently moving such lamps horizontally while contact pins thereof are at a level lower than that of the solder feed from said pot and in a direction perpendicular to the line of reciprocation of said pot to an indexing position adjacent the latter, power means for driving said conveyor, means driven by said power means and raising the adjacent pins of a lamp as it is indexed at the solder pot, to an elevation in registry with the solder feed portion of said pot, and means also driven by said power means for reciprocating said pot toward and away from a lamp while at its indexed position to effect soldering of its leads to pins of said lamp.

10. A soldering machine for lamps comprising a reciprocable solder pot, means for heating said solder pot to maintain the solder therein molten and to produce capillary flow thereof, means for feeding solder horizontally from a side of said pot comprising a pair of capillary apertures extending diagonally upward and outward in the wall of said solder pot and emerging as generally horizontal apertures slightly above the normal level of the molten solder in said pot, a conveyor for intermittently moving such lamps horizontally, while lead-containing hollow contact pins thereof are at a level lower than that of the solder-feed from said pot and in a direction perpendicular to the line of reciprocation of said pot, to an indexing position adjacent the latter, power means for driving said conveyor, means driven by said power means and raising the adjacent pins of a lamp, as it is indexed at the solder pot, to an elevation in registry with the solder feed portion of said pot, and means also driven by said power means for reciprocating said pot toward and away from a lamp as it is indexed, to effect soldering of its leads to pins thereof.

11. A soldering machine for fluorescent lamps comprising a conveyor for intermittently moving such lamps horizontally, a reciprocable solder pot on one side of said conveyor, a similar solder pot directly opposite the first pot and at the other side of said conveyor, means for heating each of said solder pots to maintain the solder therein molten and to produce capillary flow thereof, means for feeding solder horizontally from the adjacent sides of each of said pots comprising a pair of capillary apertures extending diagonally upward and outward in the wall of said solder pot and emerging as generally horizontal apertures slightly above the normal level of the molten solder in each of said pots, the lamps while on said conveyor having lead-containing hollow contact pins at a level lower than that of the solder-feed from said pots, said conveyor moving such lamps in a direction perpendicular to the line of reciprocation of said pots to an indexing position adjacent the latter, power means for driving said conveyor, means driven by said power means for raising the pins at both ends of a fluorescent lamp as it is indexed at the solder pots to an elevation in registry with the solder feed portions of said pots, and means also driven by said power means for reciprocating said pots toward and away from a lamp as it is indexed, to effect soldering of its leads to pins at both ends thereof.

12. A soldering machine for fluorescent lamps comprising a conveyor for intermittently moving such lamps horizontally, a reciprocable solder pot on one side of said conveyor, a similar solder pot offset longitudinally along but at the other side of said conveyor, means for heating each of said solder pots to maintain the solder therein molten and to produce capillary flow thereof, means for feeding solder horizontally from the adjacent sides of both of said pots comprising a pair of capillary apertures extending diagonally upward and outward in the wall of said solder pot and emerging as generally horizontal apertures slightly above the normal level of the molten solder in each of said pots, the lamps while on said conveyor having lead-containing hollow contact pins at a level lower than that of the solder-feed from said pots, said conveyor intermittently moving such lamps in a direction perpendicular to the line of reciprocation of one of said pots to an indexing position adjacent the latter and thereafter in a direction perpendicular to the line of reciprocation of the other of said pots at the opposite end of said lamp to an indexing position adjacent the latter solder pot, power means for driving said conveyor, means driven by said power means for raising the pins first at one end of a fluorescent lamp as it is indexed at a solder pot to an elevation in registry with the solder feed portion of said pot, and then at the other end as it is indexed at the other pot to an elevation in registry with the solder feed portion of said pot, and means also driven by said power means for reciprocating each pot toward the conveyor as a lamp is indexed and then away from said conveyor, to effect soldering of its leads to pins at both ends thereof.

References Cited in the file of this patent

UNITED STATES PATENTS

| Number | Name | Date |
|---|---|---|
| 812,329 | Daugherty | Feb. 13, 1906 |
| 939,453 | Thom | Nov. 9, 1909 |
| 996,374 | Swan | June 27, 1911 |
| 1,200,272 | Taylor | Oct. 3, 1916 |
| 1,702,234 | Goodridge | Feb. 12, 1929 |
| 1,722,739 | Ford | July 30, 1929 |
| 1,783,642 | Fergusen et al. | Dec. 2, 1930 |
| 1,934,796 | Friederich | Nov. 14, 1933 |
| 2,046,596 | Zwiebel | July 7, 1936 |
| 2,344,589 | Bogner | Mar. 21, 1944 |
| 2,485,444 | Hofberg | Oct. 18, 1949 |